(12) United States Patent
Sumiyoshi et al.

(10) Patent No.: US 6,447,562 B1
(45) Date of Patent: Sep. 10, 2002

(54) ABRASIVE

(75) Inventors: Takehiko Sumiyoshi, Tokyo (JP); Takuma Miyazawa, Nagano (JP)

(73) Assignees: XEBEC Technology Co., Ltd., Toyko (JP); Taimei Kagaku Kogyo Kabushiki Kaisha, Nagano (JP)

( * ) Notice: Subject to any disclaimer, the term of this patent is extended or adjusted under 35 U.S.C. 154(b) by 0 days.

(21) Appl. No.: 09/592,869

(22) Filed: Jun. 13, 2000

(30) Foreign Application Priority Data

Jan. 14, 2000 (JP) ........................................ 2000-006966

(51) Int. Cl.$^7$ .............................. B24D 3/00; B24D 3/02; B24D 3/28
(52) U.S. Cl. .............................. 51/298; 51/295; 51/293; 51/307; 51/309
(58) Field of Search .......................... 51/295, 297, 298, 51/293, 307, 309

(56) References Cited

U.S. PATENT DOCUMENTS 4,259,089 A * 3/1981 Waizer et al. ................ 51/298
6,004,198 A 12/1999 Sumiyoshi

FOREIGN PATENT DOCUMENTS

| JP | 63052972 | 3/1988 |
| JP | 04170903 | 6/1992 |
| JP | 05111876 | 5/1993 |

OTHER PUBLICATIONS

English language abstract of OR above 6/92.
English language abstract of PR above 5/93.
English language abstract of QR above 3/98.

* cited by examiner

*Primary Examiner*—Michael Marcheschi
(74) *Attorney, Agent, or Firm*—Pillsbury Winthrop LLP Intellectual Property Group

(57) ABSTRACT

An abrasive includes an alumina-based fiber bound by a matrix resin which contains diamond abrasive grains therein, and a diamond abrasive grain layer provided on the surface of the bound fiber. The abrasive is formed into, for example, a flat plate having a thickness in a range of 0.45 to 1.2 mm, and the diamond abrasive grain layer is provided on at least any one of opposite surfaces of the bound fiber. Flat filaments having a ratio of a long axis to a short axis of the cross-sectional shape thereof in a range of 1.3 to 1.8 are used for the alumina-based fiber.

9 Claims, No Drawings

ABRASIVE

BACKGROUND OF THE INVENTION

1. Field of the Invention

The present invention relates to an abrasive such as a polishing grindstone and the like, and particularly, to an abrasive which is suitable for polishing a hard material such as a sintered hard alloy, a highly hard steel and a hardened steel, and particularly, which is capable of accurately polishing a very fine portion such as a rib and a boss made of such a hard material manually or using a vibrating tool or a rotating tool.

2. Description of the Related Art

In recent years, the demand for a mold made of a highly hard steel or a hardened steel having a Rockwell hardness C (HRC) equal to or larger than 50, or a sintered hard alloy having a further high hardness, has been increased.

The abrasive material capable of polishing such hard materials is mainly diamond. However, the conventional diamond grindstone is formed by binding diamond abrasive grains using a metal or a thermosetting resin as a binder, and is used broadly for grinding and cutting such a hard material, but little used for polishing such a hard material. It is true that there has been no diamond grindstone hitherto, which is suitable, particularly for an accurate polishing. The reason is as follows: In the accurate polishing, it is a conventional common practice to polish a material by a spatula made of wood or bamboo using a diamond powder or a diamond paste. This method suffers from a problem that a long time is taken and a skill is required for the polishing. Therefore, the development of a solid grindstone type has been desired strongly. However, if the grindstone is not of a small-sized and thin shape, the grindstone cannot accommodate a work, and at the same time, the grindstone itself requires a considerable strength and a resiliency. When the conventional diamond grindstone is formed into such a shape, it is brittle and is not suitable for a practical use.

On the other hand, there are broadly known methods for reinforcing a grindstone by incorporating any of various types of reinforcing fibers. For example, Japanese Patent Application Laid-open No. 63-52972 has proposed a method for reinforcing a grindstone with a short fiber such as a silicon carbide fiber, a carbon fiber, a silicon nitride fiber, a boron fiber and an alumina fiber. It is also disclosed in this Japanese Patent Application Laid-open No. 63-52972 that a method for reinforcing a material with a long fiber is also conventionally known. A grindstone, which comprises three components: a reinforcing fiber, abrasive grains and a matrix resin and which is capable of accurately polishing a hard material, has been not known hitherto. Both of an excellent polishing property and a high strength for polishing a hard material are required for grindstones, but conventionally known fiber-reinforced grindstones do not meet this requirement sufficiently.

The fiber-reinforced grindstone suffers from the following problem: If an attempt is made to increase the content of abrasive grains in the fiber-reinforced grindstone with a polishing property taken into a serious view, the strength of the grindstone is reduced. On the other hand, if an attempt is made to increase the content of the fiber in the grindstone with the strength taken into a serious view, a practical polishing property is not provided.

SUMMARY OF THE INVENTION

Accordingly, it is an object of the present invention to provide an abrasive which has a sufficient practical strength, while having an excellent polishing property, wherein the problem associated with the prior art is solved.

To achieve the above object, according to a first aspect and feature of the present invention, there is provided an abrasive comprising an alumina-based long fiber bound by a matrix resin containing diamond abrasive grains therein, and a diamond abrasive grain layer formed on the surface of the bound fiber.

According to a second aspect and feature of the present invention, in addition to the first feature, the abrasive is formed into a flat plate-shape, and the diamond abrasive grain layer is provided at least on any one of opposite surfaces of the bound fiber.

According to a third aspect and feature of the present invention, in addition to the second feature, the abrasive is formed into a flat plate-shape, and the diamond abrasive grain layer is provided on opposite surfaces of the bound fiber.

According to a fourth aspect and feature of the present invention, in addition to the second feature, the alumina-based long fiber is wound helically at an intersection angle of 6 to 30° around a cylindrical member, and cut open in an axial direction of the cylindrical member into a sheet, the side perpendicular to the cutting-open direction being defined as a polishing end face.

According to a fifth aspect and feature of the present invention, in addition to the second feature, the abrasive is formed into a flat plate having a thickness in a range of 0.45 to 1.2 mm.

According to a sixth aspect and feature of the present invention, in addition to the first or second feature, abrasive grains forming the diamond abrasive grain layer are embedded in the matrix resin.

According to a seventh aspect and feature of the present invention, in addition to the first or second feature, the content of the diamond abrasive grains excluding the diamond abrasive grains in the abrasive grain layer is in a range of 3 to 15% by weight.

According to an eighth aspect and feature of the present invention, in addition to the first or second feature, filaments of the alumina-based long fiber are mainly filaments having a flat cross-sectional shape.

According to a ninth aspect and feature of the present invention, in addition to the eighth feature, the ratio of a long axis to a short axis of the cross-sectional shape is in a range of 1.3 to 1.8.

According to a tenth aspect and feature of the present invention, in addition to the first or second feature, the abrasive has a flexural strength of 500 Mpa or more and a flexural elastic modulus of 50 Gpa or more under application of a load in a direction perpendicular to the lengthwise direction of the alumina-based long fiber.

To produce the abrasive according to the present invention, the alumina-based fiber, the diamond abrasive grains and the matrix resin are used as necessary components, and the alumina-based fiber and the diamond abrasive grains are first arranged in a particular distributed state in the abrasive material, whereby the produced abrasive exhibits an excellent polishing property and has an enhanced strength. Such arrangements of the alumina-based fiber and the diamond abrasive grains ensures that an amount of abrasive grains necessary and sufficient for polishing a work can be incorporated without a reduction in strength of the abrasive. Further, a higher strength of the abrasive can be achieved by using the particular alumina-based long fiber as a reinforcing fiber.

Thus, the abrasive according to the present invention can be used commonly for a rough-polishing and a finish-polishing of even a hard material such as a highly hard steel having a Rockwell hardness (HRC) of 50 or more and a sintered hard alloy having a higher hardness, and further utilized for polishing a very fine portion or a small-area portion such as a groove and a corner of a mold for a rib and a boss. Further, the abrasive has an excellent accurate polishing property and such a polishing efficiency that a surface roughness Ra of a mold made of a sintered hard alloy, which is equal to 0.5 $\mu$m or less usually required, can be achieved easily in a short time.

DETAILED DESCRIPTION OF THE INVENTION

The fiber used in the abrasive according to the present invention is an alumina-based long fiber. A glass fiber, a carbon fiber, a silicon carbide fiber and the like are known conventionally as a reinforcing fiber. However, any of the known fibers is used in the abrasive, a problem of slipping of the abrasive on a surface to be polished is encountered, and the alumina-based fiber is most suitable for polishing a work, because it is considered that the leading end of the alumina-based fiber is sequentially crushed during polishing.

Diamond abrasive grains commercially available and having a mesh size in a range of about 100 to 1,000 are most preferably used in the abrasive according to the present invention, but the abrasive grains are not limited to them.

Preferred examples of the matrix resin for binding the alumina-based fiber and the abrasive grains according to the present invention are thermosetting resins such as an epoxy resin, a phenol resin, a polyimide resin, a polymaleimide resin, an unsaturated polyester resin and the like.

The feature of the abrasive according to the present invention is in that the distribution of the reinforcing fiber and the abrasive grains forming the abrasive is such that the content of the abrasive grains is higher in the outer surface than in the interior of the abrasive. Namely, the ensuring of the polishing property and the practical strength which are intended by the present invention is achieved by maintaining a good attack of the abrasive grain layer on the outer surface to a work and a high polishing property and a strength provided by the alumina-based fiber in the interior of the abrasive.

Specifically, an abrasive material is formed, for example, into a flat plate having a thickness of about 0.45 to 1.2 mm and a width of about 3 to 20 mm, and the diamond abrasive grain layer is provided on at least any one of opposite surfaces of the flat plate, preferably on both of the opposite surfaces.

In this case, the alumina-based fiber is in the form of a sheet provided by winding a fiber bundle of long filaments helically at an intersection angle of 6 to 30° around a cylindrical member (i.e., at an angle of 3 to 15° with respect to a circumferential direction of the cylindrical member) and cutting the wound fiber bundle open in an axial direction of the cylindrical member. The side of the fiber bundle perpendicular to the cutting-open direction is defined as a polishing face. Thus, an abrasive, in which no layer release cannot be caused, can be formed.

It is preferable that a fiber bundle of 300 to 3,000 filaments each having 0.06 to 2.5 TEX is used as the bundle of long filaments.

The sheet is formed into a rounded rod having a diameter of 1 to 6 mm, or a rod having any diameter and any sectional shape, and the diamond abrasive grain layer is provided on the entire peripheral surface of the rod.

In this case, a rod-shaped abrasive can be produced easily by winding the UD sheet about an axis provided by the side in a direction of the fiber.

In any of the cases, the diamond abrasive grain layer is formed by applying diamond abrasive grains to the surface of the abrasive matrix resin which has been formed into a predetermined shape and which is in an uncured state, and applying a pressure to the resulting material from the outer periphery in this state to form the material into a final shape, while squeezing the surplus matrix resin in the interior. Thus, the diamond abrasive grains forming the diamond grain layer can be embedded into the matrix resin. The diamond abrasive grains may be embedded entirely in the matrix resin, or may be embedded in the matrix resin, so that their heads may be slightly peeped out of the surface of the matrix resin.

It is preferably that the entire diamond abrasive grain layer is occupied substantially with the diamond abrasive grains.

By providing the abrasive grain layer in the above manner, the content of the abrasive grains in the outer surface of the layer is higher than that in the interior of the layer, whereby the polishing property of the abrasive for a work made of a hard material can be enhanced. On the other hand, in order to provide a practical strength necessary for a polishing operation, it is required that the content of the abrasive grains in the interior is lower than that in the outer surface. Specifically, it is preferable that the content of the abrasive grains in the interior excluding the abrasive grain layer is equal to or smaller than 15% by weight. To provide a further higher strength, it is preferable that the content of the abrasive grains is equal to or smaller than 10% by weight.

The content of the abrasive grains in the interior of the abrasive according to the present invention is as mentioned above, but it is preferable that the content of all the abrasive grains in the abrasive is in a range of 7 to 20% by weight. If the content of all the abrasive grains in the abrasive according to the present invention is equal to or smaller than 20% by weight, the abrasive has a satisfactory polishing property. Therefore, it is not required that the abrasive grains are contained in an amount larger than 20% by weight and moreover, the strength is reduced and the consumption of the abrasive is hastened. On the other hand, if the content of all the abrasive grains in the abrasive is smaller than 7% by weight, the polishing property of the abrasive is basically insufficient.

It is of course preferable that the alumina-based fiber used in the present invention has a higher strength. The alumina-based short fiber and the alumina-based brittle long fiber at the beginning of development conventionally have a tensile strength of about 100 kg/mm$^2$ at the most, but as a result of the improvement advanced thereafter, an alumina-based fiber having a tensile strength on the order of 150 to 200 kg/mm$^2$ can be produced. It is preferable that the tensile strength and the tensile elastic modulus of the alumina-based long fiber used in the present invention are equal to or larger than 1.8 Gpa (about 180 kg/mm$^2$) and equal to or larger than 180 Gpa (about 180 ton/mm$^2$), respectively.

The strength of the alumina fiber is not necessarily higher than that of the carbon fiber or the like, as described above. Therefore, even if an alumina-based fiber having a high strength is used in order to enhance the strength of a grindstone, the strength has a limit. Therefore, as a result of zealous studies, the present inventors have found that if an alumina-based fiber comprising flat filaments which mainly have a flat cross-sectional shape is used, the strength of a grindstone is further enhanced. In other words, it is preferable that the normal cross-sectional shape of the filaments of the alumina-based fiber used in the present invention is mainly flat rather than truly circular. Particular examples of the flat shapes are an elliptic shape, a cocoon shape, a rain drop-shape and the like, and these shapes may exist in combination of them. Filaments rounded in section may also exist in combination with the filaments having such shapes, but it is preferable that such filaments rounded in section exist in a smaller amount. For example, it is preferable that the content of the filaments rounded in section is equal to or smaller than 20% and more preferably, equal to or smaller than 10% of all the filaments, as viewed in the photograph of the cross section of the pressed product.

It is preferable that the ratio of a long axis to a short axis of the flat shape is in a range of 1.3 to 1.8.

The reason why the strength of the grindstone is enhanced by use of the fiber having such a flat cross-sectional shape is believed to be as follows: The area of adhesion of filaments with adjoining filaments and with abrasive grains through the matrix resin is increased, and when the pressed product is broken, a phenomenon of withdrawal of the fiber from the matrix resin is difficult to occur.

Because the abrasive according to the present invention is used for polishing a hard material, it is preferable for practical use that the particular strength is such that the flexural strength is equal to or larger than 500 Mpa, and the flexural elastic modulus is equal to or larger than 50 Gpa. In order to eliminate the fear of damage of the abrasive which is in service, a flexural strength on the order of 800 Mpa is required. If the abrasive according to the present invention is formed into a layer structure, using an alumina-based fiber having a tensile strength equal to or larger than 1.8 Gpa and a tensile elastic modulus equal to or larger than 180 Gpa, a strength of such a value can be obtained. In addition to this, if an alumina-based fiber bundle formed of filaments mainly having a flat cross-sectional shape is used, an abrasive having a higher strength can be produced. It is more preferable if the flexural strength is equal to or larger than 1,000 Mpa.

EXAMPLES

Examples of the present invention will now be described.

Example 1

An alumina-based fiber bundle of 1,000 monofilaments each having 0.6 TEX was used as a reinforcing material for a grindstone to be formed. The fiber bundle comprised 85% by weight of $Al_2O_3$ and 15% by weight of $SiO_2$ and had a diameter of 10 μm, an average tensile strength of 2.5 Gpa and an average tensile elastic modulus of 220 Gpa. A fiber bundle made by softly tying up the alumina-based filaments by an epoxy resin-based tying-up agent (in an amount of 3% per the filaments) was delivered from a bobbin and passed through a slurry of artificial abrasive diamond grains (KMG-03 made by Matsumoto Yusi, Co.) having a mesh size of 400 in water (which had a concentration of grains equal to 20% by weight and which was constantly agitated), whereby abrasive grains were adhered to the fiber bundle. Then, the resulting fiber bundle was wound helically around a rotary drum to a winding width of 350 mm at an angle of 5° with respect to a circumferential direction and at an angle of intersection of filaments equal to 10°, and dried sufficiently to remove water. Subsequently, a resin composition comprising 100 parts by weight of an epoxy resin (Epikote 828 made by Yuka Shell Epoxy, Co.), 3 parts by weight of boron trifluoride mono-methyl amine and 30 parts by weight of acetone was applied in a hand laying-up manner to the fiber bundle, and the resulting fiber bundle was dried and cut along a rotational axis of the rotary drum, thereby producing a diamond grain-containing alumina-based fiber prepreg sheet having a size of 310 mm×350 mm.

This sheet was heated and precured at 115° C. for 15 minutes and then, the same diamond abrasive grains were sprinkled onto the opposite surfaces of the sheet, until the ground was hidden visually. Thereafter, a releasing paper was placed onto the sheet having the diamond grains thereon and was pressed softly with an iron, whereby the abrasive grains were fixed. The thus-produced sheet was set and pressed in a press machine, whereby the surplus resin was squeezed out, until the thickness of the sheet reached 1 mm. Then, the sheet was heated and cured at 160° C. for 2 hours under a pressure. As a result, the diamond abrasive grains were embedded within the resin.

The plate-shaped product provided in the above manner was cut with a diamond disk cutter to provide a flat plate-shaped stick as an abrasive having a width of 10 mm, a length of 100 mm and a thickness of 1 mm.

This sample was sintered at 650° C. in the air, and the content of the resin was measured quantitatively. Then, the sample was calcined at 1,200° C. to burn the diamond, and the content of the diamond was measured quantitatively. The result showed that the entire content of the diamond was approximately 14.4% by weight. In addition, the diamond grain layer on the surface was removed and then, the sheet was calcined likewise, and the content of the diamond abrasive grains in the interior layer was measured and as a result, confirmed as being 10.2% by weight. This abrasive had an average flexural strength of 810 Mpa, and an average flexural elastic modulus of 70 Gpa.

The abrasive was attached to a vibrating tool (Turbolapswing TLS-07 made by UHT, Co.) and vibrated at 17,000 reciprocations/min by an air pressure to polish an electric discharge-machined surface (having an HRC hardness of 57 and a surface roughness Ra equal to about 2.5 μm) of SKD 11, while applying a load of 250 g to the electric discharge-machined surface. As a result, the surface roughness Ra of the electric discharge-machined surface reached about 0.5 μm.

Example 2

An alumina-based fiber bundle of 1,000 flat monofilaments each having 0.25 TEX was used as a reinforcing material for a grindstone to be formed. The fiber bundle comprised 85% by weight of $Al_2O_3$ and 15% by weight of $SiO_2$, and had an average diameter of 10 μm determined from a specific gravity of 3.2 and the TEX, an average tensile strength of 2.5 Gpa determined from the diameter, and an average tensile elastic modulus of 220 Gpa determined from the diameter. The filament had a cross-sectional shape mainly like a cocoon, as viewed in a sectional photograph thereof, and the ratio of a long axis to a short axis of the shape was mainly about 1.5. Filaments having a rounded section were little observed. A prepreg sheet was produced in the same manner as in Example 1 from the alumina-based fiber bundle.

This sheet was treated in the same manner as in Example 1 to fix the diamond abrasive grains, and was then heated and pressed under a pressure. The plate-shaped product provided in the above manner was cut with a diamond disk cutter to provide a flat plate-shaped stick as an abrasive having a width of 10 mm, a length of 100 mm and a thickness of 1 mm.

The entire content of the diamond in the abrasive was 11.5% by weight, and the content of the diamond abrasive grains in the internal layer was 8.3% by weight. This abrasive had an average flexural strength of 1020 Mpa, and an average flexural elastic modulus of 75 Gpa.

The abrasive was subjected to a polishing test similar to that in Example 1. The result showed that the surface roughness Ra of a work reached 0.4 μm.

The abrasive was also used to carry out a polishing test for 10 minutes under a vibration condition for a work made of a sintered hard alloy (V-30 having HRA of 89.0 and a surface roughness Ra equal to 1.1 μm. The result showed that the surface roughness Ra of the work reached 0.2 μm.

Example 3

In winding the alumina-based fiber bundle having the diamond abrasive grains around the rotary drum as in Example 2, the fiber bundle was wound in parallel by turns corresponding to only one layer, so that no gap was created between adjacent turns of the fiber bundle. The wound fiber bundle was dried to remove water and then, a resin composition similar to that in Example 1 was applied and dried and then cut open to produce a so-called UD sheet.

The sheet was precured at 115° C. for 15 minutes and then cut through a distance of 100 mm in a lengthwise direction of the fiber and through a distance of 40 mm in a direction perpendicular to the fiber. The resulting sheet was wound in a sushi-wound manner in parallel to the fiber to provide a rounded rod. Further, this rounded rod was rolled on similar diamond abrasive grains laid on a base, whereby the diamond abrasive grains were applied to the surface of the rounded rod. The diamond grains applied to the surface were fixed by heating the resin composition and then, the rounded rod having the diamond grains fixed thereto was pressed and cured by heating in a rubber press process to produce a rounded rod-shaped abrasive having a diameter of about 3 mm.

The entire content of the diamond in the abrasive was 13.8% by weight, and the content of the diamond in the interior layer was 10.2% by weight. The abrasive had an average flexural strength of 850 Mpa and an average flexural elastic modulus of 71 Gpa.

The abrasive was attached to a rotating tool and rotated at 30,000 RPM to carry out the polishing of an electric discharge-machined surface (having an HRC hardness of 57) of SKD 11 similar to that in Example 1. As a result, it was confirmed that this abrasive was particularly suitable for the initial polishing of a violently rough surface portion. As a result of the polishing for 10 minutes, the surface roughness Ra of the surface of the work reached about 0.7 μm.

What is claimed is:

1. An abrasive article comprising:

alumina-containing long fibers embedded in a matrix resin, the matrix resin containing diamond abrasive grains therein, and a diamond abrasive grain layer formed on a surface of the matrix resin.

2. An abrasive article according to claim 1, wherein said abrasive article is formed into a flat plate-shape having a first surface and a second surface opposed to said first surface, said diamond abrasive grain layer being provided on at least one of said first and second surfaces.

3. An abrasive article according to claim 2, wherein said abrasive article is formed into a flat plate-shape, the flat plate-shape further comprising at least one pair of opposite end faces, said opposite end faces extending perpendicular to said first and second surfaces, said diamond abrasive grain layer also being provided on said opposite end faces.

4. An abrasive article according to claim 2, wherein said abrasive article is formed into a flat plate-shape having a thickness in a range of 0.45 to 1.2 mm.

5. An abrasive article according to claim 1 or 2, wherein abrasive grains forming said diamond abrasive grain layer are embedded in said matrix resin.

6. An abrasive article according to claim 1 or 2, wherein the content of the diamond abrasive grains excluding the diamond abrasive grains in said abrasive grain layer is in a range of 3 to 15% by weight.

7. An abrasive article according to claim 1 or 2, wherein said abrasive article has a flexural strength of 500 MPa or more and a flexural elastic modulus of 50 GPa or more under application of a load in a direction perpendicular to the lengthwise direction of said alumina-containing long fibers.

8. An abrasive article according to claim 1 or 2, wherein said alumina-containing long fibers are composed of filaments having a flat cross-sectional shape.

9. An abrasive article according to claim 8, wherein the ratio of a long axis to a short axis of the cross-sectional shape is in a range of 1.3 to 1.8.

* * * * *